United States Patent

Bach et al.

[11] Patent Number: 5,310,942
[45] Date of Patent: May 10, 1994

[54] PYRIDONE DYES AND THERMAL TRANSFER THEREOF

[75] Inventors: Volker Bach, Neustadt; Ruediger Sens, Mannheim; Karl-Heinz Etzbach, Frankenthal, all of Fed. Rep. of Germany

[73] Assignee: BASF Aktiengesellschaft, Ludwigshafen, Fed. Rep. of Germany

[21] Appl. No.: 764,194

[22] Filed: Sep. 23, 1991

[30] Foreign Application Priority Data

Oct. 6, 1990 [DE] Fed. Rep. of Germany ........ 4031722

[51] Int. Cl.$^5$ .................. C07D 413/12; C07D 401/12
[52] U.S. Cl. .................................. 544/105; 544/131; 546/159; 546/162; 546/165; 546/167; 546/171; 546/193; 546/261; 546/273; 546/280; 546/281; 546/284; 546/292; 546/293; 546/297
[58] Field of Search ................ 544/105, 131; 546/159, 546/162, 165, 167, 171, 193, 261, 280, 281, 284, 292, 293, 297, 273

[56] References Cited

U.S. PATENT DOCUMENTS

| | | | |
|---|---|---|---|
| 4,695,287 | 9/1987 | Evans et al. | 8/471 |
| 5,216,169 | 1/1993 | Yamazaki et al. | 546/292 |

FOREIGN PATENT DOCUMENTS

| | | |
|---|---|---|
| 0366963 | 5/1990 | European Pat. Off. |
| 0416434 | 3/1991 | European Pat. Off. |
| 2117363 | 10/1971 | Fed. Rep. of Germany |
| 3524519 | 1/1986 | Fed. Rep. of Germany |
| 3716656 | 12/1988 | Fed. Rep. of Germany |
| 1591642 | 6/1981 | United Kingdom |
| 2209036 | 4/1989 | United Kingdom |

OTHER PUBLICATIONS

Chemical Abstracts, Band 78, 1973, Columbus, Ohio, U.S.A., Zaitsev, et al., "Structure of 2-methoxy-3-hydroxy-6-phenylazopyridine", Nr. 123,507p.

Yamazaki, Chemical Abstracts, vol. 115, (1991), 138,211u.

Komamora, Chemical Abstracts, vol. 115, (1991), 258,465b.

*Primary Examiner*—Richard L. Raymond
*Attorney, Agent, or Firm*—Oblon, Spivak, McClelland, Maier & Neustadt

[57] ABSTRACT

Pyridone transfer dyes have the formula

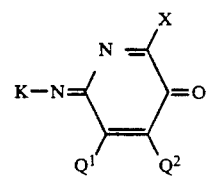

where
- $Q^1$ is hydrogen, fluorine, chlorine, methyl or a substituted amino radical,
- $Q^2$ is hydrogen, fluorine or chlorine or $Q^1$ and $Q^2$ together with the carbon atoms to which they are attached form an aromatic carbocyclic or heterocyclic ring,
- x is a heterocyclic radical, a carboxylic or carboxamide radical or substituted amino radical and
- K is an aromatic radical.

2 Claims, No Drawings

PYRIDONE DYES AND THERMAL TRANSFER THEREOF

The present invention relates to pyridone dyes of the formula I

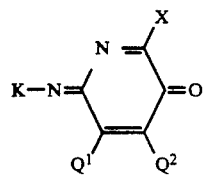

(I)

where
Q¹ is hydrogen, fluorine, chlorine, methyl or a radical of the formula —NH—CO—R¹, —NH—CO—OR¹, —NH—CO—NR¹R², NH—CS—OR¹, —NH—CS—NR¹R², —NH—CO—R³, —NH—SO₂—R¹, —NH—SO₂₂—R³ or —NH—SO₂—NR¹R², where R¹ and R² are identical or different and each is independently of the other $C_1$-$C_8$-alkyl, which may be substituted or monosubstituted and which may be interrupted by one or two oxygen atoms in ether function, $C_5$-$C_7$-cycloalkyl, phenyl or tolyl, or else —NR¹R² is amino, and R³ is a five- or six-membered aromatic heterocyclic radical which may be benzofused and contains one or more hetero atoms selected from the group consisting of nitrogen, oxygen and sulfur, Q² is hydrogen, fluorine or chlorine or Q¹ and Q² together with the carbon atoms to which they are attached form a five- or six-membered aromatic carbocyclic or heterocyclic ring, X is the abovementioned radical R³ or a radical of the formula —CO—OR¹, —CO—NHR¹, —CO—NH—CO—R¹, —CO—NH—CO—R³, —CO—NH—SO₂—R³, —NH—CO—R¹, —NH—CO—OR¹, —NH—CO—NR¹R², —NH—CS—OR¹, —NH—CS—NR¹R², —NH—CO—R³, —NH—SO₂—R¹, —NH— SO₂—R³ or —NH—SO₂—NR¹R², where R¹, R² and R³ are each as defined above, and K is an aromatic carbocyclic or heterocyclic radical, and to a process for the thermal transfer thereof.

DE-A-3,524,519 discloses indoaniline dyes which have a benzene ring instead of the abovementioned pyridone ring. Furthermore, EP-A-366,963 describes naphthoquinone dyes which instead of the abovementioned pyridone ring have a naphthalene ring to which a heterocyclic radical is bonded via a carbonyl amino group.

However, it has been found that the prior art dyes still have defects in their application properties.

It is an object of the present invention to provide novel pyridone dyes which are advantageously suitable for thermal transfer.

We have found that this object is achieved by the pyridone dyes of the formula I defined at the beginning.

Aromatic carbocyclic or heterocyclic radicals K are derived for example from the aniline, aminonaphthalene, indole, quinoline, benzoxazine or aminothiazole series.

Preference is given to pyridone dyes of the formula I where

K is a radical of the formula

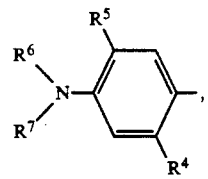 (IIa)

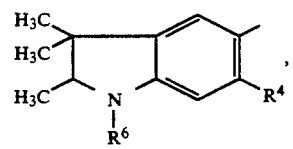 (IIb)

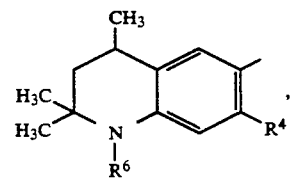 (IIc)

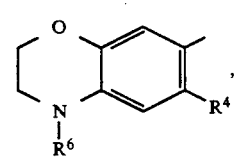 (IId)

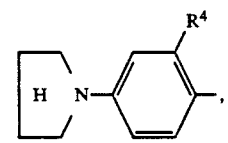 (IIe)

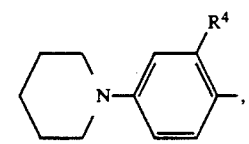 (IIf)

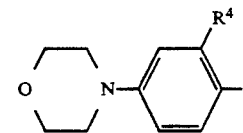 (IIg)

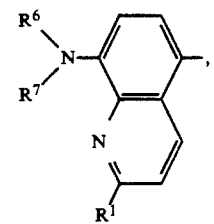 (IIh)

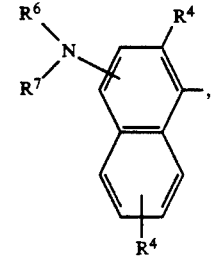 (IIi)

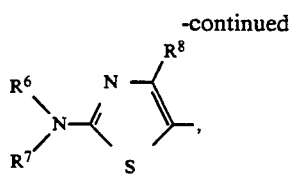

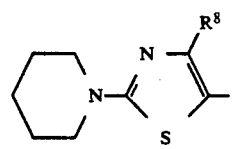

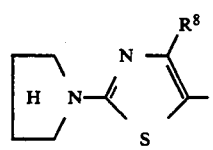

or

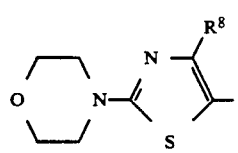

where $R^4$ is hydrogen, methyl, methoxy, $C_1$–$C_4$-alkylsulfonylamino, $C_1$–$C_4$-mono- or -dialkylaminosulfonylamino or the radical —NHCOR$^9$ or —NHCO$_2$R$^9$, where $R^9$ is phenyl, benzyl, tolyl or $C_1$–$C_8$-alkyl which may be interrupted by one or two oxygen atoms in ether function, $R^5$ is hydrogen, methoxy or ethoxy, $R^6$ and $R^7$ are identical or different and each is independently of the other hydrogen, $C_1$–$C_8$-alkyl, which may be substituted or unsubstituted and which may be interrupted by one or two oxygen atoms in ether function, or $C_5$–$C_7$-cycloalkyl, $R^8$ is hydrogen, halogen, $C_1$–$C_6$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl, hydroxyl or $C_1$–$C_8$-monoalkylamino, and $R^1$ is as defined above.

Any alkyl groups occurring in the formula of the pyridone dyes of the present invention may be either straight-chain or branched.

Substituted alkyl occurring in the formula of the pyridone dyes of the present invention may possess as substituents for example cyano, phenyl, tolyl, $C_1$–$C_6$-alkanoyloxyl $C_1$–$C_4$-alkoxycarbonyl or $C_1$–$C_4$-alkoxycarbonyloxy, of which in the last-mentioned case the alkoxy group may be substituted by phenyl or $C_1$–$C_4$-alkoxy.

Suitable $R^1$, $R^2$, $R^6$, $R^7$, $R^8$ and $R^9$ radicals are for example methyl, ethyl, propyl, isopropyl, butyl, isobutyl, sec-butyl, pentyl, isopentyl, neopentyl, tertpentyl, hexyl and 2-methylpentyl.

$R^1$, $R^2$, $R^6$, $R^7$ and $R^9$ may each also be for example heptyl, octyl, 2-ethylhexyl, 2-methoxyethyl, 2- or 3-methoxypropyl, 2-ethoxyethyl, 2- or 3-ethoxypropyl, 2-propoxyethyl, 2- or 3-propoxypropyl, 2-butoxyethyl, 2-or 3-butoxypropyl, 3,6-dioxaheptyl or 3,6-dioxaoctyl.

$R^1$, $R^2$, $R^6$ and $R^7$ may each also be for example 2-cyanoethyl, 2- or 3-cyanopropyl, 2-acetyloxyethyl, 2-or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2-or 3-ethoxycarbonyloxypropyl, 2-propoxycarbonyloxyethyl, 2- or 3-propoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, benzyl, 2-methylbenzyl, 1- or 2-phenylethyl, cyclopentyl, cyclohexyl or cycloheptyl.

$R^4$ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, monoor dipropylaminosulfonylamino, mono- or diisopropylaminosulfonylamino, mono- or dibutylaminosulfonylamino or (N-methyl-N-ethylaminosulfonyl)amino.

$R^8$ may also be for example phenyl, 2-methylphenyl, 2,4-dimethylphenyl, 2-methoxyphenyl, 2,4-dimethoxyphenyl, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$R^3$ is derived from a five- or six-membered aromatic heterocyclic radical which may be benzofused and which contains one or more hetero atoms selected from the group consisting of nitrogen, oxygen and sulfur.

Suitable heterocyclic structures, with or without substituents, from which the radical $R^3$ may be derived are for example pyrrole, furan, thiophene, pyrazole, imidazole, oxazole, isoxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine and pyrazine.

Of special interest are heterocycles of the pyrrole, thiophene, isoxazole, pyridine or pyridazine series.

Suitable $R^3$—CO and $R^3$—SO$_2$ radicals are in particular those five- or six-membered aromatic heterocyclic radicals which are derived from the following heterocyclic carboxylic acids $R^3$—COOH or sulfonic acids $R^3$—SO$_3$H:

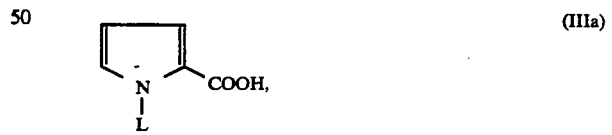

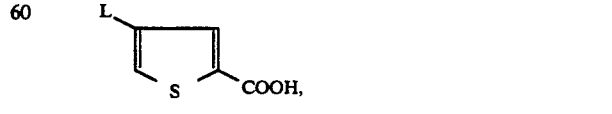

-continued

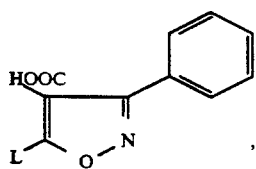    (IIIe)

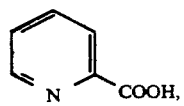    (IIIf)

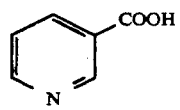    (IIIg)

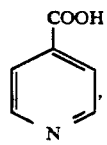

or

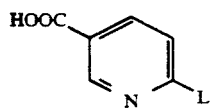

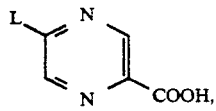, where

L is in each case $C_1$-$C_4$-alkyl.

Preference is given to pyridone dyes of the formula I where $Q^1$ is hydrogen, chlorine or methyl and
$Q^2$ is hydrogen or chlorine.

Particular preference is given to pyridone dyes of the formula I where K is a radical of the formula IIa, IIc, IIe, IIf, IIg, IIj, IIk, II1 or IIm, of which a radical of the formula IIa or IIc is of particular interest.

Of particular suitability are pyridone dyes of the formula Ia

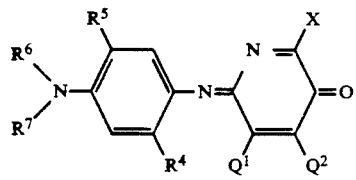    (Ia)

where $Q^1$ is hydrogen, chlorine or methyl,
$Q^2$ is hydrogen or chlorine,
X is a radical of the formula —CO—NH—$R^1$, —NH—CO—$R^1$, —NH—CO—$OR^1$ or —NH—CO—$NR^1R^2$, where $R^1$ and $R^2$ are each independently of the other $C_1$-$C_8$-alkyl, 2-cyanoethyl, benzyl, $C_1$-$C_4$-alkanoyloxy—$C_1$-$C_4$-alkyl, $C_1$-$C_4$-alkoxycarbonyl—$C_1$-$C_4$-alkyl, $C_5$-$C_7$-cycloalkyl, phenyl or tolyl or else —$NR^1R^2$ is amino, $R^4$ is hydrogen, methyl, methoxy or the radical —$NHCOR^9$ or —$NHCO_2R^9$, where $R^9$ is phenyl, benzyl, tolyl or $C_1$-$C_8$-alkyl which may be interrupted by an oxygen atom in ether function, $R^5$ is hydrogen, and $R^6$ and $R^7$ are each independently of the other hydrogen, $C_1$-$C_8$-alkyl, 2-cyanoethyl, benzyl, $C_1$-$C_4$-alkanoyloxy-$C_1$-$C_4$-alkyl, $C_1$-$C_4$-alkoxycarbonyl-$C_1$-$C_4$-alkyl, or $C_1$-$C_4$-alkoxycarbonyloxy-$C_1$-$C_4$-alkyl.

Also of particular interest are pyridone dyes of the formula Ib

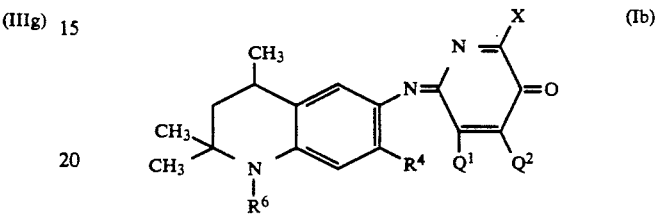    (Ib)

where $Q^1$ is hydrogen, chlorine or methyl,
$Q^2$ is hydrogen or chlorine,
X is a radical of the formula —CO—NH—$R^1$, —NH—CO—$R^1$, —NH—CO—$OR^1$ or —NH—CO—$NR^1R^2$, where $R^1$ and $R^2$ are each independently of the other $C_1$-$C_8$-alkyl, 2-cyanoethyl, benzyl, $C_1$-$C_4$-alkanoyloxy-$C_1$-$C_4$-alkyl, $C_1$-$C_4$-alkoxycarbonyl-$C_1$-$C_4$-alkyl, $C_1$-$C_4$-alkoxycarbonyloxy-$C_1$-$C_4$-alkyl, $C_5$-$C_7$-cycloalkyl, phenyl or tolyl or else —$NR^1R^2$ is amino, $R^4$ is hydrogen, methyl, methoxy or the radical —$NHCOR^9$ or —$NHCO_2R^9$, where $R^9$ is phenyl, benzyl, tolyl or $C_1$-$C_8$-alkyl which may be interrupted by an oxygen atom in ether function, and $R^6$ is hydrogen, $C_1$-$C_8$-alkyl, 2-cyanoethyl, benzyl, $C_1$-$C_4$-alkanoyloxy-$C_1$-$C_4$-alkyl or $C_1$-$C_4$-alkoxycarbonyloxy-$C_1$-$C_4$-alkyl.

Of very particular interest are pyridone dyes of the formula Ia or Ib where X is the radical —NH—$COR^1$, where $R^1$ is $C_1$-$C_8$-alkyl which may be interrupted by an oxygen atom in ether function, and R 4 is the radical —NH—$COR^9$ or —$NHCO_2R^9$, where $R^9$ is phenyl, benzyl, tolyl or $C_1$-$C_8$-alkyl which may be interrupted by an oxygen atom in ether funtion.

The pyridone dyes of the formula I according to the present invention are preparable by methods known per se.

For example, a nitroso compound of the formula IV

$$K-N=O \qquad (IV)$$

where K is as defined above, can be condensed with a pyridone of the formula V

    (V)

where $Q^1$, $Q^2$ and X are each as defined above (see for example DE-A-3 716 656).

It is also possible to couple amines of the formula VI $$K-NH_2 \quad (VI)$$

where K is as defined above, oxidatively with the pyridines of the formula V (see for example U.S. Pat. No. 4,695,287).

It is a further object of the present invention to provide a novel process for the thermal transfer of dyes.

In the thermotransfer printing process, a transfer sheet which contains a thermally transferable dye in one or more binders on a substrate, with or without suitable assistants, is heated from the back with an energy source, for example a thermal printing head or a laser, in short pulses (lasting fractions of a second), causing the dye to migrate out of the transfer sheet and diffuse into the surface coating of a receiving medium. The essential advantage of this process is that the amount of dye to be transferred (and hence the color gradation) is readily controllable through adjustment of the energy to be emitted by the energy source.

In general, color recording is carried out using the three subtractive primaries yellow, magenta and cyan (with or without black).

To ensure optimal color recording, the dyes must have the following properties:
ready thermal transferability,
little tendency to migrate within or out of the surface coating of the receiving medium at room temperature,
high thermal and photochemical stability and resistance to moisture and chemical substances,
suitable hues for subtractive color mixing,
a high molar absorption coefficient,
no tendency to crystallize out on storage of the transfer sheet.

These requirements are very difficult to meet at one and the same time.

For this reason most of the existing thermal transfer dyes do not have the required property profile.

We have found that the object of a novel process for the thermal transfer of dyes is achieved by a process for transferring pyridone dyes from a transfer to a sheet of plastic-coated paper by diffusion or sublimation with the aid of an energy source, which comprises using a transfer with one or more dyes of the abovementioned formula I.

Compared with the dyes used in existing processes, the dyes of the formula I to be transferred in the process of the present invention generally possess improved migration properties in the receiving medium at room temperature, readier thermal transferability, higher thermal and photochemical stability, readier industrial accessibility, better resistance to moisture and chemical substances, higher color strength, better solubility or better suitability for subtractive color mixing (higher purity of hue, more favorable shape of absorption bands). They are also particularly advantageously suitable for dye mixtures with triazolopyridine dyes as described in earlier patent application EP-A-416 434. This is true chiefly in respect of better transferability, higher inked ribbon stability (better solubility in the binder), higher light fastness, better distribution of the transfer dyes in the receiving medium and in particular the preparation of better black mixtures.

To prepare the dye transfers required for the process of the present invention, the dyes are incorporated into a suitable organic solvent or into mixtures of solvents together with one or more binders and possibly assistants to form a printing ink in which the dye is preferably present in a molecularly dispersed, ie. dissolved, form. The printing ink can be applied to the inert substrate by knife coating and air dried.

Suitable organic solvents for the dyes I are for example those in which the solubility of the dyes I is greater than 1% by weight, preferably greater than 5% by weight, at 20° C.

Examples which may be mentioned are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and capable of binding the dye to the inert substrate in a form in which it will not rub off. Preference is given here to those binders which, after the printing ink has been air dried, hold the dye in a clear, transparent film in which no visible crystallization of the dye occurs.

Examples of such binders are cellulose derivatives, eg. methylcellulose, ethylcellulose, ethylhydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate and polyvinylpyrrolidone. It is also possible to use polymers and copolymers of acrylates or their derivatives, such as polyacrylic acid, polymethyl methacrylate or styrene-acrylate copolymers, polyester resins, polyamide resins, polyurethane resins or natural CH resins such as gum arabic. Further suitable binders are described for example in DE-A-3 524 519.

Preferred binders are ethylcellulose, ethylhydroxyethylcellulose, polyvinyl butyrate and polyvinyl acetate.

The ratio of binder to dye may vary, preferably from 1:1 to 10:1.

Possible assistants are release agents as mentioned in EP-A-227 092, EP-A-192 435 and the patent applications cited therein, but also in particular organic additives which prevent the transfer dyes from crystallizing out in the course of storage and heating of the inked ribbon, for example cholesterol or vanillin.

Inert substrate materials are for example tissue, blotting or parchment paper and plastics films possessing good heat resistance, for example metallized or unmetallized polyester, polyamide or polyamide. The inert substrate may additionally be coated on the side facing the thermal printing head with a lubricant or slipping layer in order that adhesion of the energy source, in particular the thermal printing head, to the substrate material may be prevented. Suitable lubricants are described for example in EP-A-216 483 and EP-A-227 095. The thickness of the substrate is in general from 3 to 30 μm, preferably from 5 to 10 μm.

The dye-receiving layer can be basically any heat resistant plastics layer which possesses affinity for the dyes to be transferred, for example a modified polycarbonate or polyester. Suitable recipes for the receiving layer composition are described in detail for example in EP-A-227 094, EP-A-133 012, EP-A-133 011, EP-A-111 004, JP-A-199 997/1986, JP-A-283 595/1986, JP-A-237 694/1986 and JP-A-127 392/1986.

The transfer process is effected by means of an energy source, eg. a laser or a thermal printing head, which in the latter case must be heatable to ≦300° C. in order that the transfer of the dye may take place within the time range t: $0 < t < 15$ msec. In the course of transfer, the dye migrates out of the transfer sheet and diffuses into the surface coating of the receiving medium.

The dyes of the present invention are also advantageously suitable for dyeing synthetic materials, for example polyesters, polyamides or polycarbonates, in particular textile fabrics of polyester or polyamide, or polyester-cotton blend fabrics.

The novel dyes are also advantageously suitable for the production of color filters as described for example in EP-A-399 473. They can also be used with advantage in the production of toners for use in electrophotography.

Further details concerning the invention may be discerned from the Examples which follow, in which the percentages are by weight, unless otherwise stated.

Preparation of dyes

EXAMPLE 1

11 g of 3-diethylaminoacetanilide (96% pure) were dissolved in 100 ml of water and 50 ml of concentrated hydrochloric acid. At 0°-5° C. 18 ml of 23% strength sodium nitrite solution were then added dropwise. To complete the nitrosation the mixture was subsequently stirred at 0°-5° C. for 2 hours. It was then adjusted with 25% strength ammonium hydroxide solution to a pH of from 7 to 8 and the free nitroso compound was extracted with 20 ml of methylene chloride. The organic phase was added to a solution of 6.05 g of 2-amino-3-hydroxypyridine in 50 ml of acetic anhydride and the reaction solution was stirred at room temperature overnight. After 100 ml of water had been added, the oily dye phase was separated off and chromatographed over a silica gel column with ethyl acetate. After the eluate had been concentrated, the dye came down as a precipitate, which was filtered off with suction, washed with methanol and dried.

Yield: 0.18 g of spectrally pure dye of the formula

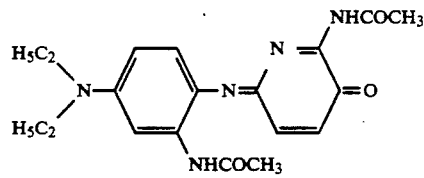

having a melting point of 188° C. and an absorption maximum (measured in tetrahydrofuran) of 641 ran.

The same method was used to obtain the dyes of Tables 1 and 2 below. The Tables contain not only the absorption maximum (measured in tetrahydrofuran) but also the $R_f$ value on silica gel and the eluent, toluene (T)/ethyl acetate (EA), together with the volume ratio which was used in chromatographing the dye.

TABLE I

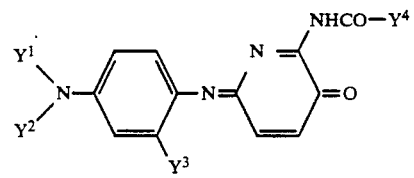

| Ex. No. | $Y^1$ | $Y^2$ | $Y^3$ | $Y^4$ | $\lambda_{max}$ (nm) | $R_f$ value | T:EA |
|---|---|---|---|---|---|---|---|
| 2 | $C_2H_5$ | $C_2H_5$ | $NHCO_2C_2H_4OC_2H_5$ | $CH_3$ | 637 | 0.38 | 0:1 |
| 3 | $C_2H_5$ | $C_4H_9$ | $CH_3$ | $CH_3$ | 626 | 0.40 | 3:2 |
| 4 | $C_2H_4CN$ | $C_2H_5$ | H | $CH_3$ | 590 | 0.45 | 0:1 |
| 5 | Benzyl | $C_2H_5$ | H | $CH_3$ | 601 | 0.28 | 3:2 |
| 6 | Benzyl | $C_2H_5$ | $CH_3$ | $CH_3$ | 617 | 0.42 | 3:2 |
| 7 | $C_2H_4OCOCH_3$ | $C_2H_5$ | H | $CH_3$ | 600 | 0.45 | 0:1 |
| 8 | $C_2H_4OCOCH_3$ | $C_2H_5$ | $NHCOCH_2OCH_3$ | $CH_3$ | 630 | 0.30 | 0:1 |
| 9 | $C_2H_4OCOCH_3$ | $C_4H_9$ | $NHCOCH_3$ | $CH_3$ | 633 | 0.34 | 0:1 |
| 10 | $C_2H_4OC_2H_5$ | $C_2H_4OC_2H_5$ | $NHCOCH_3$ | $CH_3$ | 636 | 0.36 | 0:1 |
| 11 | $C_2H_5$ | $C_2H_4OCH_3$ | $CH_3$ | $CH_3$ | 621 | 0.39 | 0:1 |
| 12 | $C_4H_9$ | $C_4H_9$ | $NHCOCH_3$ | $CH_3$ | 644 | 0.46 | 0:1 |
| 13 | $C_2H_5$ | $C_2H_4OCH_3$ | $CH_3$ | 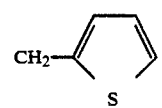 | 622 | 0.39 | 3:2 |
| 14 | $C_2H_5$ | $C_2H_4OCH_3$ | $CH_3$ | 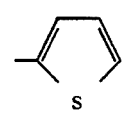 | 635 | 0.44 | 3:2 |
| 15 | $C_2H_5$ | $C_2H_4OCH_3$ | $CH_3$ | $C(CH_3)_3$ | 623 | 0.47 | 3:2 |
| 16 | $C_2H_5$ | $C_2H_4OCH_3$ | $CH_3$ | $C_6H_5$ | 631 | 0.24 | 8:2 |
| 17 | $C_2H_5$ | $C_2H_4OCH_3$ | $CH_3$ | 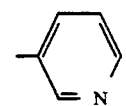 | 634 | 0.14 | 0:1 |

TABLE I-continued
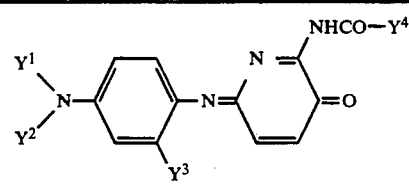
| Ex. No. | Y¹ | Y² | Y³ | Y⁴ | $\lambda_{max}$ (nm) | $R_f$ value | T:EA |
|---|---|---|---|---|---|---|---|
| 18 | CH(CH₃)₂ | C₂H₅ | H | 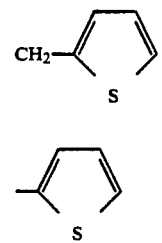 | 633 | 0.54 | 3:2 |
| 19 | CH(CH₃)₂ | C₂H₅ | H | 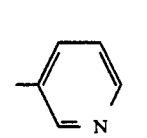 | 639 | 0.38 | 8:2 |
| 20 | CH(CH₃)₂ | C₂H₅ | H | C(CH₃)₃ | 629 | 0.43 | 8:2 |
| 21 | CH(CH₃)₂ | C₂H₅ | H | C₆H₅ | 636 | 0.56 | 3:2 |
| 22 | CH(CH₃)₂ | C₃H₅ | H | 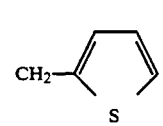 | 638 | 0.24 | 0:1 |
| 23 | C₂H₅ | C₂H₅ | NHCO₂CH₃ | 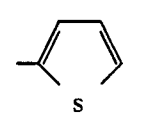 | 641 | 0.48 | 3:2 |
| 24 | C₂H₅ | C₂H₅ | NHCO₂CH₃ | 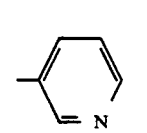 | 650 | 0.60 | 0:1 |
| 25 | C₂H₅ | C₂H₅ | NHCO₂CH₃ | C(CH₃)₃ | 642 | 0.44 | 3:2 |
| 26 | C₂H₅ | C₂H₅ | NHCO₂CH₃ | 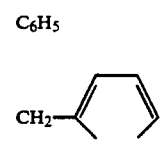 | 650 | 0.10 | 0:1 |
| 27 | C₂H₅ | C₂H₅ | NHCO₂CH₃ | C₆H₅ | 647 | 0.51 | 3:2 |
| 28 | C₂H₅ | C₂H₅ | NHCOCH₃ | 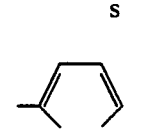 | 646 | 0.39 | 0:1 |
| 29 | C₂H₅ | C₂H₅ | NHCOCH₃ | 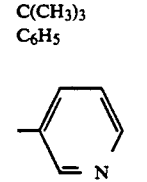 | 655 | 0.38 | 0:1 |
| 30 | C₂H₅ | C₂H₅ | NHCOCH₃ | C(CH₃)₃ | 646 | 0.32 | 3:2 |
| 31 | C₂H₅ | C₂H₅ | NHCOCH₃ | C₆H₅ | 652 | 0.30 | 3:2 |
| 32 | C₂H₅ | C₂H₅ | NHCOCH₃ | | 654 | | |

TABLE I-continued

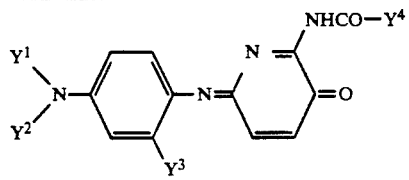

| Ex. No. | $Y^1$ | $Y^2$ | $Y^3$ | $Y^4$ | $\lambda_{max}$ (nm) | $R_f$ value | T:EA |
|---|---|---|---|---|---|---|---|
| 33 | $C_2H_5$ | $C_2H_5$ | H | $CH_2$-(2-thienyl) | 619 | 0.34 | 3:2 |
| 34 | $C_2H_5$ | $C_2H_5$ | H | 2-thienyl | 627 | 0.33 | 3:2 |
| 35 | $C_2H_5$ | $C_2H_5$ | H | $C(CH_3)_3$ | 619 | 0.39 | 3:2 |
| 36 | $C_2H_5$ | $C_2H_5$ | H | $C_6H_5$ | 624 | 0.42 | 3:2 |
| 37 | $C_2H_5$ | $C_2H_5$ | H | 3-pyridyl | 626 | 0.15 | 0:1 |

TABLE 2

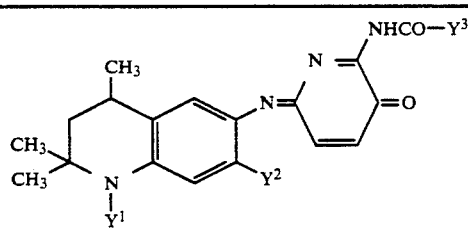

| Ex. No. | $Y^1$ | $Y^2$ | $Y^3$ | $\lambda_{max}$ (nm) | $R_f$ value | T:EA |
|---|---|---|---|---|---|---|
| 38 | H | H | $CH_3$ | 619 | 0.38 | 0:1 |
| 39 | $C_2H_5$ | $CH_3$ | $CH_3$ | 645 | 0.22 | 3:2 |
| 40 | $C_2H_4OC_2H_5$ | $CH_3$ | $CH_3$ | 639 | 0.24 | 8:2 |
| 41 | $CH_3$ | $CH_3$ | $CH_3$ | 641 | 0.51 | 0:1 |
| 42 | $C_2H_4CO_2C_2H_5$ | H | $CH_2$-(2-thienyl) | 627 | 0.36 | 3:3 |
| 43 | $C_2H_4CO_2C_2H_5$ | H | 2-thienyl | 633 | 0.58 | 0:1 |
| 44 | $C_2H_4CO_2C_2H_5$ | H | $C(CH_3)_3$ | 625 | 0.43 | 3:2 |
| 45 | $C_2H_4CO_2C_2H_5$ | H | $C_6H_5$ | 632 | 0.35 | 3:2 |
| 46 | $C_2H_4CO_2C_2H_5$ | H | 3-pyridyl | 634 | 0.20 | 0:1 |
| 47 | $C_2H_5$ | H | $CH_2$-(2-thienyl) | 638 | 0.42 | 3:2 |

TABLE 2-continued

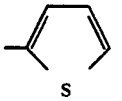

| Ex. No. | Y¹ | Y² | Y³ | $\lambda_{max}$ (nm) | $R_f$ value | T:EA |
|---|---|---|---|---|---|---|
| 48 | $C_2H_5$ | H | 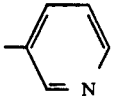 | 647 | 0.45 | 3:2 |
| 49 | $C_2H_5$ | H | $C(CH_3)_3$ | 638 | 0.15 | 8:2 |
| 50 | $C_2H_5$ | H | $C_6H_5$ | 644 | 0.41 | 3:2 |
| 51 | $C_2H_5$ | H | 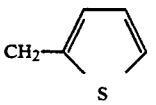 | 646 | 0.14 | 0:1 |
| 52 | $CH_3$ | $CH_3$ | 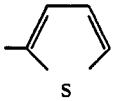 | 647 | 0.60 | 3:2 |
| 53 | $CH_3$ | $CH_3$ | 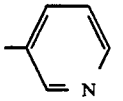 | 653 | 0.60 | 3:2 |
| 54 | $CH_3$ | $CH_3$ | $C(CH_3)_3$ | 644 | 0.65 | 3:2 |
| 55 | $CH_3$ | $CH_3$ | $C_6H_5$ | 651 | 0.33 | 8:2 |
| 56 | $CH_3$ | $CH_3$ | 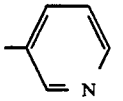 | 654 | 0.13 | 3:2 |

Transfer of dyes

For a simple quantitative examination of the transfer characteristics of the dyes, the thermal transfer was effected with large hotplates instead of a thermal printing head, the transfer temperature being varied within the range 70° C.<T<120° C. while the transfer time was fixed at 2 minutes.

α) General recipe for coating the substrate with dye: 1 g of binder was dissolved in 8 ml of 8:2 v/v toluene/ethanol at 40°-50° C. A solution of 0.25 g of dye in 5 ml of tetrahydrofuran was added with stirring and, if necessary, insoluble residue was filtered off. The print paste thus obtained was applied with an 80 μm doctor blade to a polyester sheet (thickness: 6-10 μm) and dried with a hair dryer.

β) Testing of thermal transferability

The dyes used were tested as follows: The polyester sheet donor containing the in-test dye in the coated front was placed face down on a sheet of commercially available paper receptor (further details below) and pressed down. Donor/receptor were then wrapped in aluminum foil and heated between two hotplates at various temperatures T (within the temperature range 70° C.<T<120° C.). The amount of dye diffusing into the bright plastics layer of the receptor is proportional to the optical density (=absorbance A). The latter was determined photometrically. The plots of the logarithm of the absorbance A of the colored receptor papers measured within the temperature range from 80° to 110° C. against the reciprocal of the corresponding absolute temperature are straight lines from whose slope it is possible to calculate the activation energy LET for the transfer experiment:

$$\Delta E_T = 2{,}3 \cdot R \cdot \frac{\Delta \log A}{\Delta \left[\frac{1}{T}\right]}$$

To complete the characterization, the plots additionally reveal the temperature T*[° C.] at which the absorbance A of the colored receptor papers attains the value 1.

The dyes listed below in Table 3 were processed according to α) and the dye-coated transfers obtained were tested for their transfer characteristics according to β). The table shows in each case the thermotransfer parameters T* and $\Delta E_T$ and the binders used.

The receptor (R) used was Hitachi Color Video Print Paper of grades VY-S, VY-T and VY-C.

The key to the abbreviations is as follows:

B=binder
EC=ethylcellulose
EHEC=ethylhydroxyethylcellulose

TABLE 3

| Example No. | Dye No. | B | R | T* [°C.] | ΔE$_T$ [kcal/mol] |
|---|---|---|---|---|---|
| 57 | 1 | V | VY-T | 88 | 16 |
| 58 | 1 | V | VY-C | 96 | 13 |
| 59 | 5 | V | VY-T | 84 | 14 |
| 60 | 9 | EC | VY-C | 94 | 14 |
| 61 | 10 | EHEC | VY-T | 87 | 15 |
| 62 | 14 | EC | VY-T | 92 | 17 |
| 63 | 2 | V | VY-T | 90 | 16 |
| 64 | 29 | V | VY-S | 70 | 12 |

EXAMPLE 65

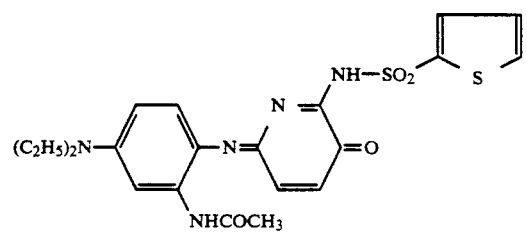

| B | N | λmax [nm] (measured in methylene chloride) | T* [°C.] | ΔE$_T$ [kcal/mol] |
|---|---|---|---|---|
| V | VY-S | 658 | 96 | 10 |

Similar results are obtained using the dyes below.

| Ex. No. | Dye |
|---|---|
| 66 | [structure with CONHC$_2$H$_5$, (C$_2$H$_5$)$_2$N-phenyl-N=, CH$_3$] |
| 67 | [structure with NHCOC$_3$H$_7$, (C$_2$H$_5$)$_2$N-phenyl-N=, CH$_3$] |
| 68 | [structure with CONHC$_2$H$_5$, (C$_2$H$_5$)$_2$N-phenyl-N=, CH$_3$, Cl] |
| 69 | [structure with NHSO$_2$C$_2$H$_5$, C$_2$H$_5$/C$_4$H$_9$-N-phenyl(CH$_3$)-N=, Cl] |
| 70 | [structure with NHCOCH(CH$_3$)$_2$, (C$_2$H$_5$)$_2$N-phenyl-N=, Cl] |
| 71 | [structure with CO$_2$C$_3$H$_7$, (C$_2$H$_5$)$_2$N-phenyl-N=, NHCOCH$_3$] |
| 72 | [structure with CONHCOC$_3$H$_7$, (C$_2$H$_5$)$_2$N-phenyl-N=, CH$_3$, NHCOCH$_3$] |
| 73 | [structure with CONHCOC$_2$H$_5$, tetrahydroquinoline with CH$_3$, CH$_3$, CH$_3$, C$_4$H$_9$] |
| 74 | [structure with thiophene-CH$_3$, (C$_2$H$_5$)$_2$N-phenyl-N=] |
| 75 | [structure with thiophene-CH$_3$, C$_2$H$_5$/C$_4$H$_9$-N-phenyl(CH$_3$)-N=] |
| 76 | [structure with thiazole, C$_2$H$_5$/C$_4$H$_9$-N-phenyl(CH$_3$)-N=, CH$_3$, CH$_3$] |

-continued

| Ex. No. | Dye |
|---|---|
| 77 | 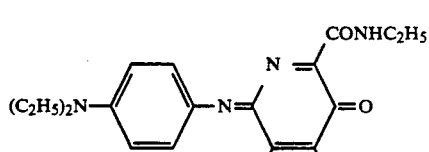 |
| 78 | 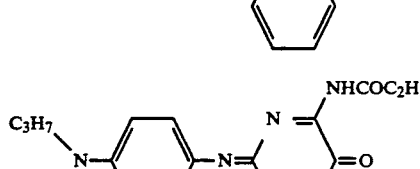 |

We claim:
1. A pyridone dye of the formula I

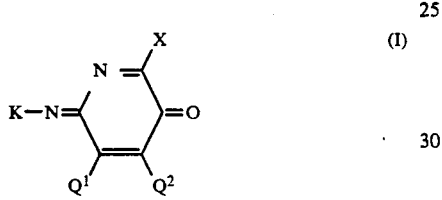

where
Q$^1$ is hydrogen, fluorine, chlorine, methyl or radical of the formula —NH—CO—R$^1$, —NH—CO—OR$^1$, —NH—CO—NR$^1$R$^2$, NH—CS—OR$^1$, —NH—CO—NR$^1$R$^2$, —NH—CO—R$^3$, —NH—SO$_2$R$^1$, —NH—SO$_2$—R$^3$ or —NH—SO$_2$—NR$^1$R$^2$, where R$^1$ and R$^2$ are identical or different and each is independently of the other C$_1$-C$_8$-alkyl, which may be substituted or unsubstituted and which maybe interrupted by one or two oxygen atoms in ether function, C$_5$-C$_7$-cycloalkyl, phenyl or tolyl, or else —NR$^1$R$^2$ is amino, and R$^3$ is a five- or six-membered aromatic heterocyclic radical selected from the group consisting of, pyrrole, furan, thiophene, pyrazole, imidazole, oxazole, isoxazole, thiazole, isothiazole, 1,2,3-Ztriazole, 1,2,4-oxadizole, 1,3,4-oxadiazole, 1,2,4-thiadiazole, 1,3,4-thiadiazole, pyridine, pyridazine, pyrimidine and pyrazine, each of which may be substituted, Q$^2$ is hydrogen, fluorine or chlorine or Q$^1$ and Q$^2$ together with the carbon atoms to which they are attached form a five- or six-membered aromatic carbocyclic or heterocyclic ring, X is a radical of the formula —CO—OR$^1$, —CO—NHR$^1$, —CO—NH—CO—R$^1$, —CO—NH—CO—R$^3$, —CO—NH—SO$_2$—R$^3$, —NH—CO—R$^1$, —NH—CO—OR$^1$, —NH—CO—NR$^1$R$^2$, —NH—CS—OR$^1$, —NH—CS—NR$^1$R$^2$, —NH—CO—R$^3$, —NH—CO—R$^3$, —NH—SO$_2$—R$^1$, —NH—SO$_2$—R$^3$ or —NH—SO$_2$—NR$^1$R$^2$, where R$^1$, R$^2$ and R$^3$ are each as defined above, and K is a radical of the formula

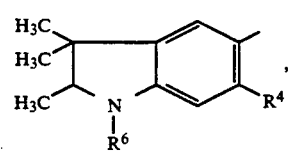 (IIb)

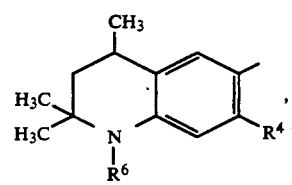 (IIc)

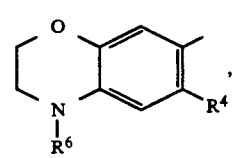 (IId)

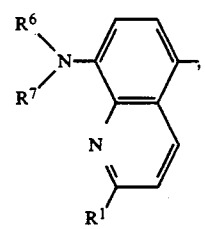 (IIh)

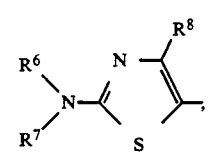 (IIj)

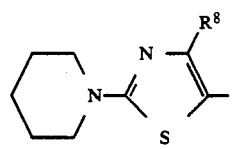 (IIk)

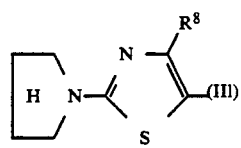 (III)

or

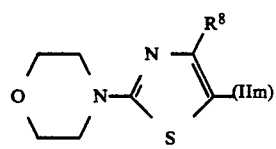 (IIm)

where
R$^4$ is hydrogen, methyl, methoxy, C$_1$-C$_4$-alkylsulfonylamino, C$_1$-C$_4$-mono- or -dialkylaminosulfonylamino or the radical —NHCOR$^9$ or —NHCO$_2$R$^9$, where R$^9$ is phenyl, benzyl, tolyl or C$_1$-C$_8$-alkyl which may be interrupted by one or two oxygen atoms in ether function, R$^6$ and R$^7$ are identical or different and each is independently of the other hydrogen, C$_1$-C$_8$-alkyl, which may be substituted or unsubstituted and which may be interrupted by one or two oxygen atoms in ether function, or $C_5$-$C_7$-cycloalkyl, $R^8$ is hydrogen, halogen, $C_1$-$C_6$-alkyl, unsubstituted or $C_1$-$C_4$-alkyl- or $C_1$-$C_4$alkoxy-substituted phenyl, unsubstituted or $C_1$-$C_4$-alkyl- or $C_1$-$C_4$-alkoxy-substituted benzyl, cyclohexyl, thienyl, hydroxyl or $C_1$-$C_8$-monoalkylamino and $R^1$ is as defined above.

2. A pyridone dye of ht formula I

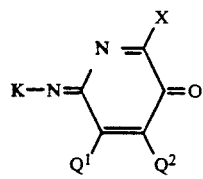
(I)

where $Q^1$ is hydrogen, fluorine, chlorine, methyl or a radical of the formula —NH—CO—$R^1$, —NH—CO—O$R^1$, —NH—CO—N$R^1R^2$, NH—CS—O$R^1$, —NH—CS—N$R^1R^2$, —NH—CO—$R^3$, —NH—SO$_2$—$R^1$, —NH—SO$_2$—$R^3$ or —NH—SO$_2$—N$R^1R^2$, where $R^1$ and $R^2$ are identical or different and each is independently of the other $C_1$-$C_8$-alkyl, which may be substituted or unsubstituted and which may be interrupted by one or two oxygen atoms in ether function, $C_5$-$C_7$-cycloalkyl, phenyl or tolyl, or else —N$R^1R^2$ is amino, and $R^3$ is a five- or six-membered aromatic heterocyclic radical selected form the group consisting of

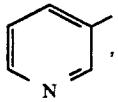
(IIIa)

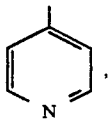
(IIIb)

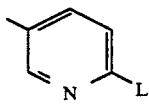
(IIIc)

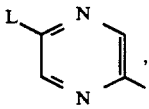
(IIId)

(IIIe)

(IIIf)

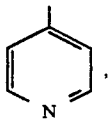
(IIIg)

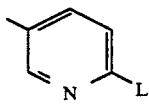

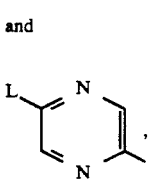

and

L is $C_1$-$C_4$-alkyl, $Q^2$ is hydrogen, fluorine or chlorine or $Q^1$ and $Q^2$ together with the carbon atoms to which they ar attached form a five-or six-membered aromatic carbocyclic or heterocyclic ring, X is a radical of the formula —CO—O$R^1$, —CO—NH$R^1$, —CO—NH—CO—$R^1$, —CO—NH—CO—$R^3$, —CO—NH—SO$_2$—$R^3$, —NH—CO—$R^1$, —NH—CO—O$R^1$, —NH—CO—N$R^1R^2$, —NH—CS—O$R^1$, —NH—CS—N$R^1R^2$, —NH—CO—$R^3$, —NH—SO$_2$—$R^1$, —NH—SO$_2$—$R^3$ or —NH—SO$_2$—N$R^1R^2$, where $R^1$, $R^2$ and $R^3$ are each as defined above, and K is a radical of the formula

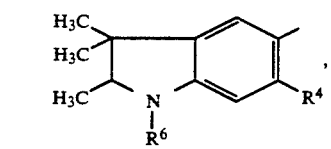
(IIb)

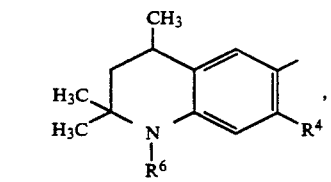
(IIc)

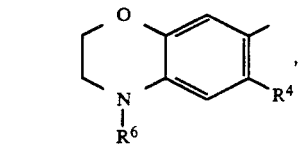
(IId)

-continued

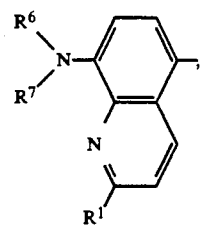 (IIh)

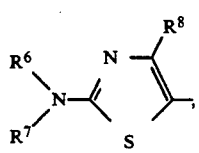 (IIj)

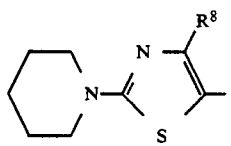 (IIk)

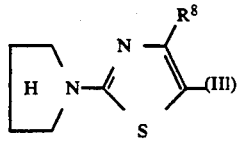 (III)

or

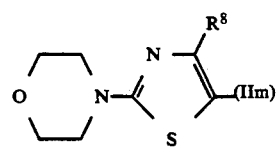 (IIm)

where $R^4$ is hydrogen, methyl, ethoxy, $C_1$–$C_4$-alkylsulfonylamino, $C_1$–$C_4$-mono- or -dialkylaminosulfonylamino or the radical —NHCOR$^9$ or —NHCO$_2$R$^9$, where $R^9$ is phenyl, benzyl, tolyl or $C_1$–$C_8$-alkyl which may be interrupted by one or two oxygen atoms in ether function, $R^6$ and $R^7$ are identical or different and each is independently of the other hydrogen, $C_1$–$C_4$-alkyl, which may be substituted or unsubstituted and which may be interrupted by one or two oxygen atoms in ether function, or $C_5$–$C_7$-cycloalkyl, $R^8$ is hydrogen, halogen, $C_1$–$C_6$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl, hydroxyl or $C_1$–$C_8$-monoalkylamino and $R^1$ is as defined above.

* * * * *